(12) United States Patent
Berube et al.

(10) Patent No.: US 9,996,365 B2
(45) Date of Patent: Jun. 12, 2018

(54) MIRRORING APPLICATION GUI LAYOUT TO OPERATING SYSTEM GUI LAYOUT

(71) Applicant: INTERNATIONAL BUSINESS MACHINES CORPORATION, Armonk, NY (US)

(72) Inventors: Richard E. Berube, Nashua, NH (US); Fang Lu, Billerica, MA (US); Jennifer L. Moriarty, Stoneham, MA (US); Sneha Palarapu, Nashua, NH (US); Tejaswini K. Ranadive, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 14/710,174

(22) Filed: May 12, 2015

(65) Prior Publication Data

US 2016/0335098 A1 Nov. 17, 2016

(51) Int. Cl.
*G06F 3/048* (2013.01)
*G06F 9/44* (2018.01)
*G06F 3/0481* (2013.01)

(52) U.S. Cl.
CPC .......... *G06F 9/4443* (2013.01); *G06F 3/0481* (2013.01); *G06F 3/04817* (2013.01)

(58) Field of Classification Search
CPC .............. G06F 3/0481; G06F 11/2056; G06F 11/2082; G06F 3/04817
See application file for complete search history.

(56) References Cited

U.S. PATENT DOCUMENTS

| 7,554,522 | B2 | 6/2009 | Sinclair, II et al. |
| 7,729,900 | B2 | 6/2010 | Moore et al. |
| 7,895,522 | B2 | 2/2011 | Wong et al. |
| 9,420,326 | B1 * | 8/2016 | Kessler ................ H04N 5/4403 |

(Continued)

FOREIGN PATENT DOCUMENTS

| EP | 0661627 A1 | 7/1995 |
| WO | 2011119302 A1 | 9/2011 |
| WO | 2012122376 A2 | 9/2012 |

OTHER PUBLICATIONS

IBM, "Client Side Customization of Widgets and Layout", IP.com, IPCOM000138499D, Jul. 21, 2006, pp. 1-2.

(Continued)

*Primary Examiner* — Jeffrey A Gaffin
*Assistant Examiner* — Justin S Lee
(74) *Attorney, Agent, or Firm* — Law Office of Jim Boice

(57) ABSTRACT

A method, system, and/or computer program product formats a layout of an application graphical user interface (GUI). A description of a layout of an operating system (OS) GUI is received. The OS supports an application, and the layout of the OS GUI identifies positions of representations of OS features that are displayed on the OS GUI. The OS features are mapped to application features of the application that is supported by the OS. A layout of an application GUI for the application is formatted to mirror an appearance of the OS GUI, such that representations of the application features are displayed in a same relative position on the application GUI as representations of mapped-to OS features on the OS GUI.

11 Claims, 4 Drawing Sheets

(56) References Cited

U.S. PATENT DOCUMENTS

| | | | |
|---|---|---|---|
| 2004/0088377 A1* | 5/2004 | Henriquez | H04L 69/329 709/219 |
| 2006/0230105 A1* | 10/2006 | Shappir | H04L 67/08 709/203 |
| 2011/0099494 A1 | 4/2011 | Yan et al. | |
| 2011/0307831 A1* | 12/2011 | Cowan | G06F 3/04817 715/823 |
| 2013/0097523 A1 | 4/2013 | Kimball et al. | |
| 2013/0117719 A1 | 5/2013 | Bender et al. | |
| 2014/0298108 A1* | 10/2014 | Cui | G06F 11/2056 714/39 |

OTHER PUBLICATIONS

K. Gajos et al., "Automatically Generating Personalized User Interfaces With SUPPLE", Elsevier B.V., Artificial Intelligence 174, 2010, pp. 910-950.

* cited by examiner

MIRRORING APPLICATION GUI LAYOUT TO OPERATING SYSTEM GUI LAYOUT

BACKGROUND

The present disclosure relates to the field of computers, and specifically to computers that have operating systems that support application programs. Still more particularly, the present disclosure relates to the visual layout of applications on a graphical user interface (GUI).

An operating system (OS) is software that manages hardware and software on a computing device. An application program (also known as an "application") is software that performs one or more tasks or functions, such as word processing, bookkeeping, web browsing, etc. An application is said to "run on top of" the OS, since the OS supports ("runs beneath") the application in order to interface with the computer's hardware.

SUMMARY

A method, system, and/or computer program product formats a layout of an application graphical user interface (GUI). A description of a layout of an operating system (OS) GUI is received. The OS supports an application, and the layout of the OS GUI identifies positions of representations of OS features that are displayed on the OS GUI. The OS features are mapped to application features of the application that is supported by the OS. A layout of an application GUI for the application is formatted to mirror an appearance of the OS GUI, such that representations of the application features are displayed in a same relative position on the application GUI as representations of mapped-to OS features on the OS GUI.

DETAILED DESCRIPTION

Figure 1:
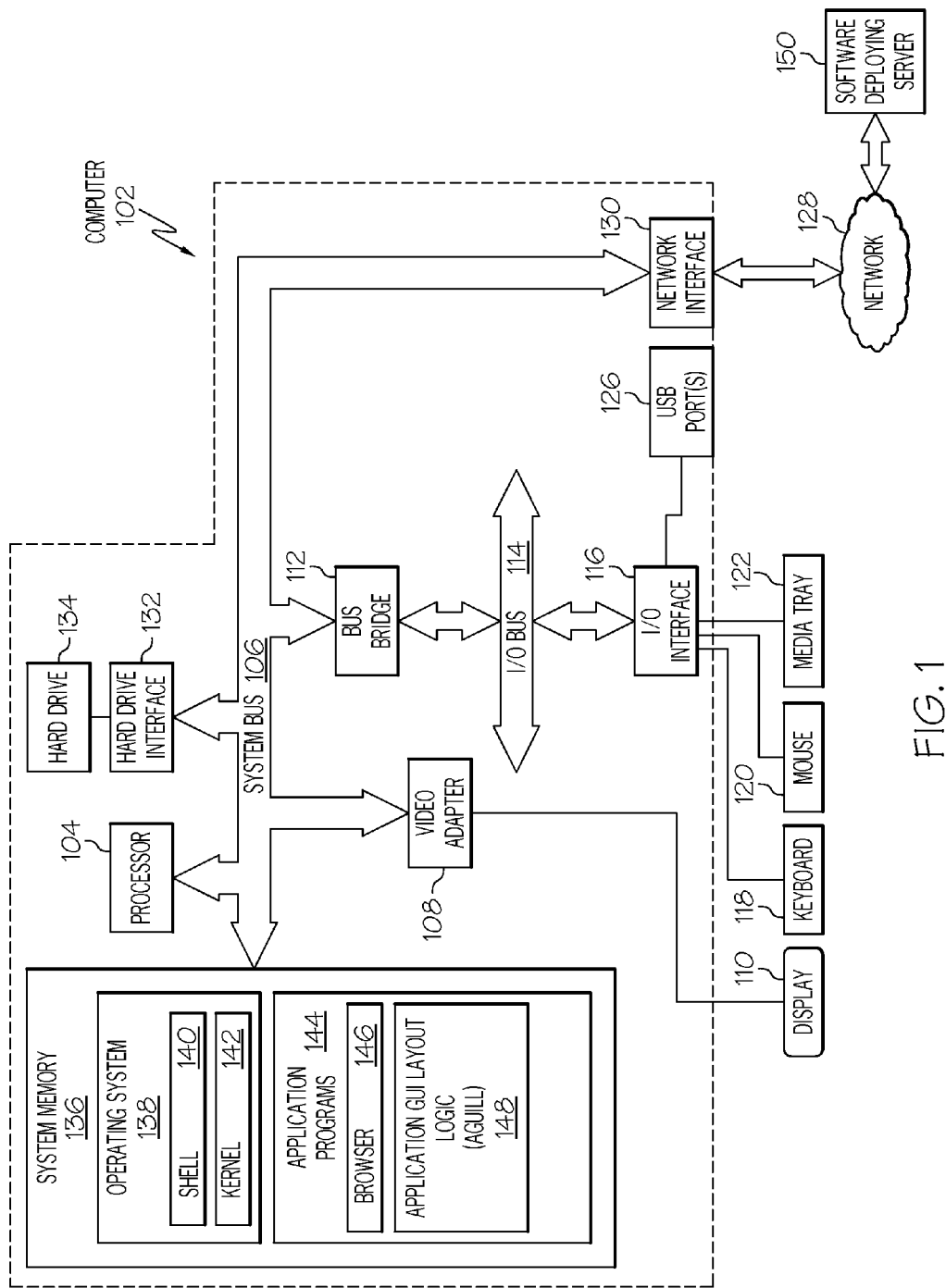
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an application graphical user interface layout logic (AGUILL) 148. AGUILL 148 includes code for implementing the processes described below, including those described in FIGS. 2-4. In one embodiment, computer 102 is able to download AGUILL 148 from software deploying server 150, including in an on-demand basis, wherein the code in AGUILL 148 is not downloaded until needed for execution. In one embodiment of the present invention, software deploying server 150 performs all of the functions associated with the present invention (including execution of AGUILL 148), thus freeing computer 102 from having to use its own internal computing resources to execute AGUILL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
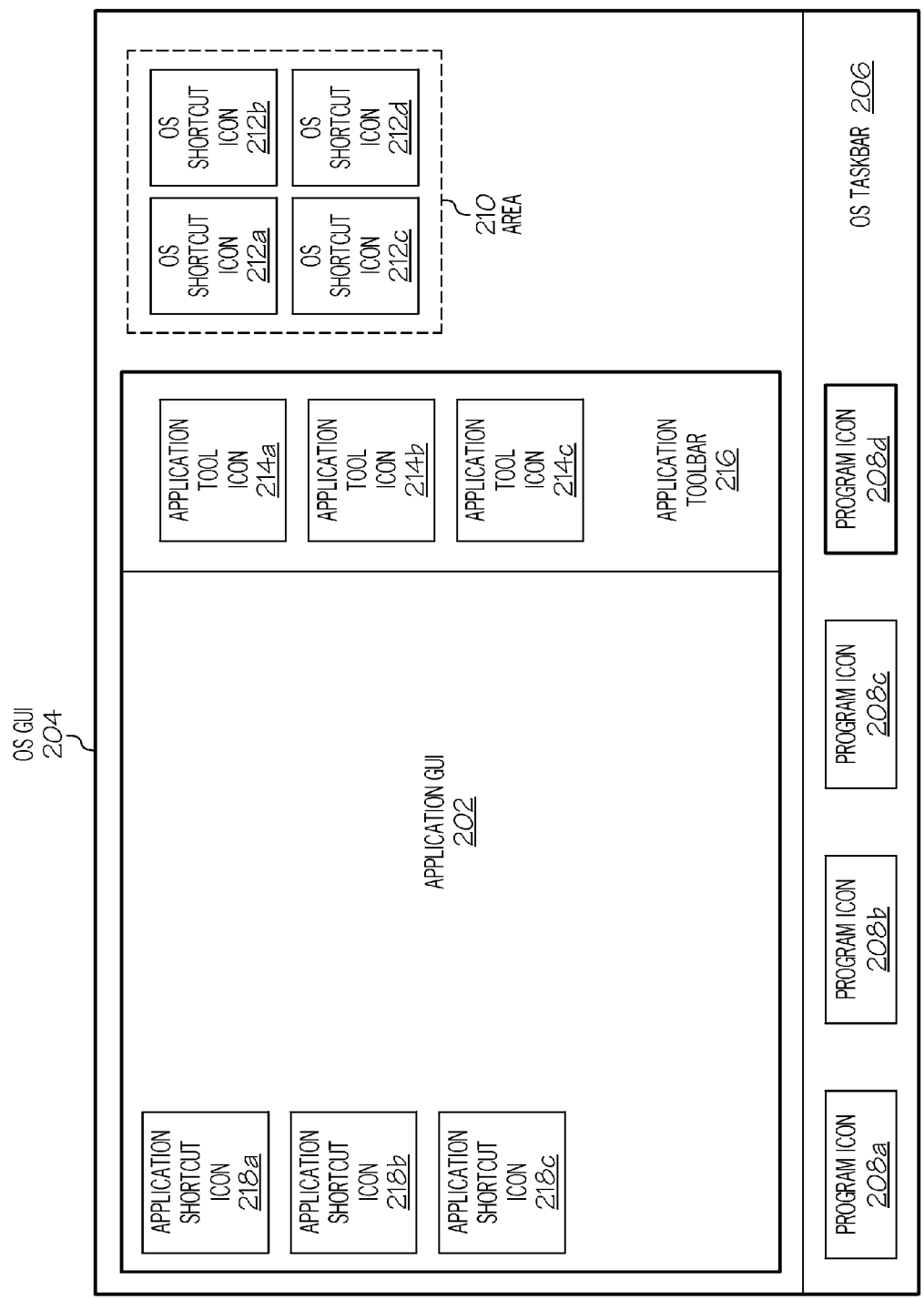
FIG. 2 illustrates an application graphical user interface (GUI) displayed over an operating system (OS) GUI.

With reference now to FIG. 2, an exemplary application graphical user interface (GUI) 202 is shown being displayed over an operating system (OS) GUI 204.

In FIG. 2, the OS GUI 204 has a taskbar 206. As shown within the taskbar 206, multiple program icons 208a-208d are presented. Each of the program icons 208a-208d represent an application or other resource that is supported by the underlying OS. If used to represent an application, each of the program icons 208a-208d represent an application that is currently running (e.g., the application that generates the application GUI 202), or is not currently running. If not currently running, an application represented by one of the program icons 208a-208d can be called up (executed) by activating (e.g., clicking or double-clicking with a mouse) the appropriate program icon. If an application is currently running and yet minimized (such that that application's GUI is not currently shown on the OS GUI 204), then that application can be maximized (to be displayed on the OS GUI 204, as shown in FIG. 2 as application GUI 202). If an application is currently running and displayed on the OS GUI 204 (e.g., the application that supports the application GUI 202), then a particular program icon from the program icons 208a-208d is visually modified (e.g., by the bold border around program icon 208d, which is associated with the application that generates the application GUI 202).

Also part of the OS GUI 204 is an area 210, within which multiple OS shortcut icons 212a-212d are displayed. OS shortcut icons 212a-212d are activatable (e.g., "clickable") icons that take the user to a resource such as a file, a website, a storage device, an application, etc. That is, while the OS taskbar 206 is reserved for icons that represent applications, any area on the desktop area of the OS GUI 204 can be used to display icons associated with resources including but not limited to applications (e.g., files, website links, storage devices, etc.). In the depiction of OS GUI 204 in FIG. 2, a specific area 210 has been allocated by the user and/or the underlying OS to display the OS shortcut icons 212a-212d.

Within the application GUI 202 shown in FIG. 2 are activatable icons that are supported by the underlying application, including application tool icons 214a-214c (shown within an application toolbar 216) and application shortcut icons 218a-218c (shown being displayed on the main surface area of the application GUI 202).

Application tool icons 214a-214c are tools that are provided by the application that supports application GUI 202. For example, assume that this application is a word processing program. Examples of executable tools represented by the application tool icons 214a-214c include but are not limited to printing a document, checking spelling of a document, saving a document, changing a font/format of a document, etc. The present invention considers the application tools represented by and provided by the application tool icons 214a-214c to be analogous to the programs represented by and provided by the program icons 208a-208d. That is, tools provided by and supported by an application are analogous to programs provided by and supported by an operating system, since application tools depend on the structure and support of an application just as programs depend on the structure and support of an operating system.

Furthermore and in one embodiment, the application GUI 202 may display application shortcut icons 218a-218c, which are executable icons that can take the user to another application (as suggested by their name), such as a browser that may take the user to a particular webpage, or a graphics program, or a spreadsheet program, etc. For example, if the application GUI 202 supports a word processing program, then the application shortcut icons 218a-218c may take the user to a webpage that is related to the text document being created, or to a spreadsheet/graphic application that can generate a graph/table for insertion into the text document, etc. The present invention considers the application shortcuts represented by and provided by the application shortcut icons 218a-218c to be analogous to the shortcuts represented by and provided by the OS shortcut icons 212a-212d. That is, shortcuts to resources provided by and supported by an application are analogous to shortcuts provided by and supported by an operating system, since both types of shortcuts are not limited to only applications (as in the case of the OS taskbar 206) and tools (as in the case of the application toolbar 216) that are specific for the underlying OS/application.

With the assumption that application tools are to an application as programs are to an operating system (i.e., the relationship "application tools:application" is equivalent to "programs:operating system"), then it would be useful for the layout of the application GUI 202 to mirror that of the OS GUI 204 (i.e., the relationship application "tools:programs" is equivalent to "application:operating system"). However, this is not the case in FIG. 2. That is, in the OS GUI 204, the OS taskbar 206 (containing the program icons 208a-208d representing programs) is shown at the bottom of the OS GUI 204. However, the analogous application tool icons 214a-214c are shown in an application toolbar 216 that is on the right side of the application GUI 202. Similarly, the application shortcut icons 218a-218c are shown along the left side of the application GUI 202, while the analogous OS shortcut icons 212a-212d are shown clustered on the upper right-hand side of the OS GUI 204. This disparity presents a visual confusion to the user.

Figure 3:
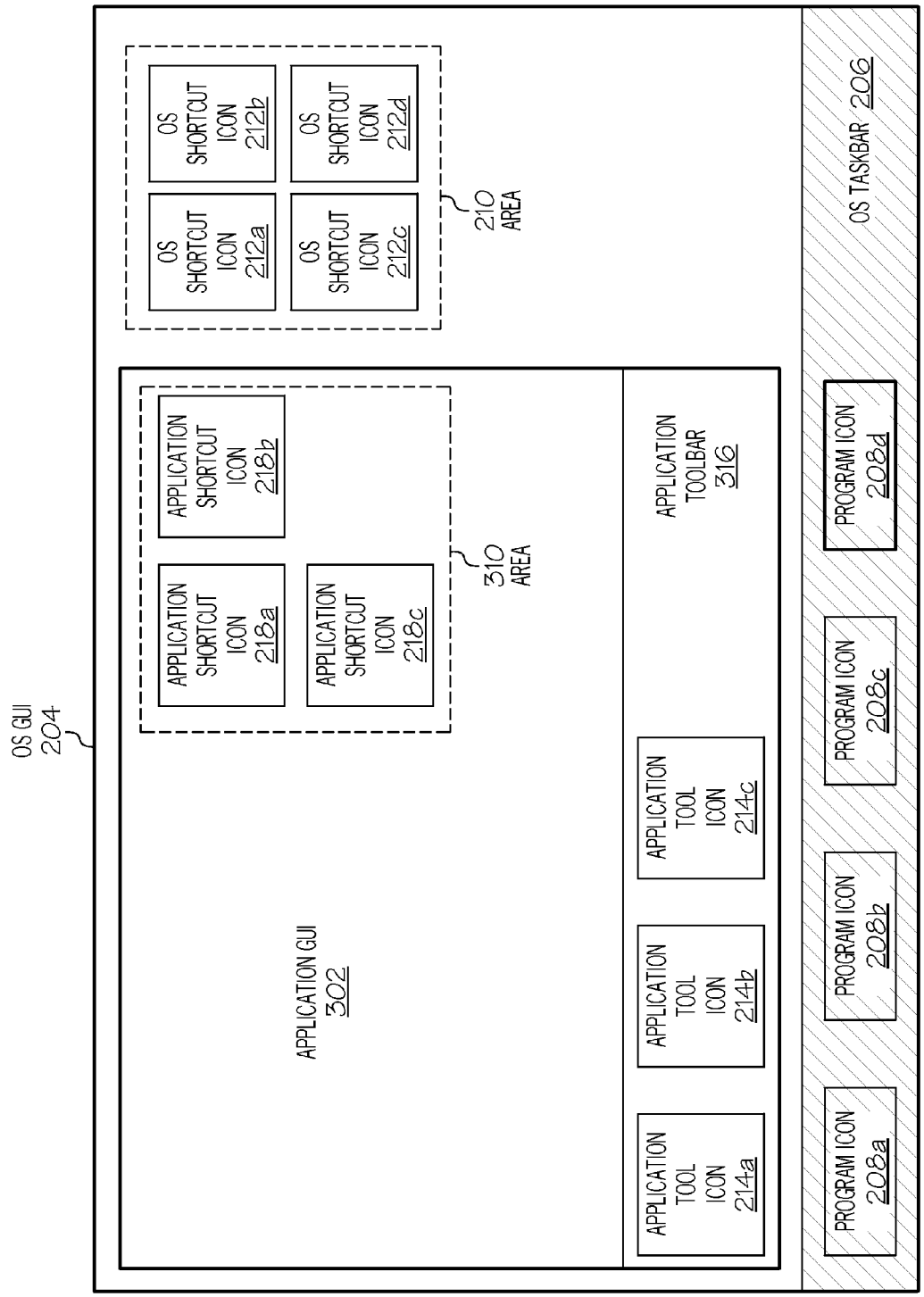
FIG. 3 depicts the application GUI in FIG. 2 reconfigured to mirror the layout of the OS GUI shown in FIG. 2.

Thus, FIG. 3 depicts the application GUI 202 in FIG. 2 reconfigured as application GUI 302 to mirror the layout of the OS GUI 204 shown in FIG. 2. That is, the application toolbar 216 in FIG. 2 is now repositioned as application toolbar 316 in FIG. 3 at the bottom of the application GUI 302, such that the application toolbar 316 and the analogous OS taskbar 206 are both at the bottom of their respective GUIs (application GUI 302 and OS GUI 204). Similarly, the application shortcut icons 218a-218c are clustered together in the upper right-hand corner of application GUI 302 (i.e., area 310), just as the OS shortcut icons 212a-212d are clustered together in the upper right-hand corner (i.e., area 210) of OS GUI 204. This repositioning of various icons within the application GUI 302 provides that user with a novel and useful improvement to the application GUI 302, where particular types of icons used by an application are in the same location as that used by the underlying operating system, thereby making it easier for the user to visually locate such icons within the application GUI 302.

Figure 4:
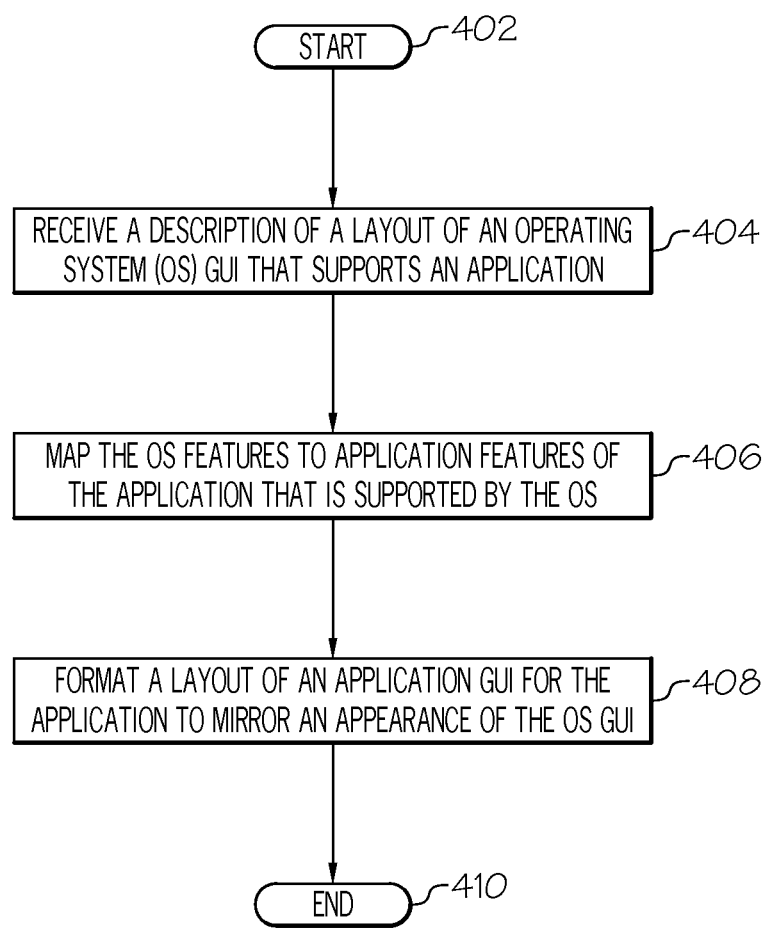
FIG. 4 is a high-level flow chart of one or more steps performed by one or more processors to configure an application GUI to mirror a layout of a GUI for an underlying OS on which the application is running.

With reference now to FIG. 4, a high-level flow chart of one or more steps performed by one or more processors to configure an application GUI to mirror a layout of a GUI for an underlying OS on which the application is running is presented.

After initiator block 402, a description of a layout of an operating system (OS) GUI (e.g., OS GUI 204 shown in FIG. 2) is received (block 404). As described herein, the OS supports an application, and the layout of the OS GUI identifies positions of representations of OS features (e.g., program icons 208a-208d and OS shortcut icons 212a-212d shown in FIG. 2) that are displayed on the OS GUI.

As described in block 406, the OS features are mapped to application features of the application that is supported by the OS. For example, application tools supported by the application are mapped to (e.g., considered equivalent in nature) programs supported by the OS, and application shortcuts are mapped to OS shortcuts.

As described in block 408, a layout of an application GUI (e.g., application GUI 202 in FIG. 2) is reformatted (e.g., as application GUI 302 in FIG. 3) for the application to mirror an appearance of the OS GUI. Thus, representations of the application features are displayed in a same relative position on the application GUI as representations of mapped-to OS features on the OS GUI.

The flow-chart ends at terminator block 410.

As described herein, in one embodiment of the present invention, the representations of the OS features are program icons (e.g., program icons 208a-208d shown in FIG. 2), and the representations of the application features are application tool icons (e.g., application tool icons 214a-214c shown in FIG. 2).

In one embodiment of the present invention, OS shortcut icons are displayed as a cluster in a specific area (e.g., area 210 shown in FIG. 2) on a desktop of the OS GUI (e.g., area 210 shown in FIG. 2). The OS shortcut icons (e.g., OS shortcut icons 212a-212d shown in FIG. 2) are mapped to (e.g., considered similar or otherwise related/equivalent) to application shortcut icons (e.g., application shortcut icons 218a-218c shown in FIG. 2). The specific area on the desktop of the OS GUI is then mapped to a specific area of a window from the application GUI (e.g., to identify the same relative positioning of the area on the application GUI as that of the OS GUI). The application shortcut icons are then displayed on the specific area of the window from the application GUI (e.g., area 310 shown in FIG. 3).

In one embodiment of the present invention, representations of OS features are visually modified to be different from the representations of the application features, thus aiding the user in visually associating the representations of the OS features with the OS and the representations of the application features with the application. For example, as shown in FIG. 3, the OS taskbar 206 is shaded while the application toolbar 316 is not. Thus, the user is able to quickly see which icons are related to the OS and which are related to the application.

As described herein the present invention can be a software program that is installed at the operating system level. That is, once preferences are defined for the OS (e.g., where to display taskbars, sizes of icons, etc.), then these same preferences are automatically applied to some (user-selected or system-selected) or all applications running on the OS. In one embodiment, the system (e.g., AGUILL 148 shown in FIG. 1) will ascertain that the application has features (e.g., tools represented by application tool icons 214a in FIG. 2) that are similar in nature/function as features (e.g., programs represented by program icons 208a-208d in FIG. 2) found provided by the underlying OS. Once these similarities are ascertained, then the different icons can be mapped/correlated to one another, thereby enabling the repositioning of icons within the application GUI as described herein.

As described herein in one or more exemplary embodiments of the present invention, the system detects the operating system's taskbar location setting and stores that information. The system then scans through the user's operating system desktop icons and examines the core characteristic of each application (e.g. the application is an email client, the application is a web browser, the application is a software development tool, etc.). Optionally, the system also collects information about the frequency of each program's usage, such that the application GUI of less frequently used applications mirror the OS GUI, while more frequently used applications retain their original layout. That is, if a user is new to an application (i.e., uses it less than a predefined frequency), then that user will need to see a layout with which he/she is familiar (i.e., that of the OS GUI). However, if the user uses an application frequently (more than a predefined frequency), then the application GUI retains its original layout, since the user is used to its idiosyncrasies (i.e., where icons are located).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of reconfiguring an application graphical user interface (GUI), the method comprising:
receiving, by one or more processors, a description of a layout of an operating system (OS) GUI for an OS, wherein the OS supports an application, and wherein the layout of the OS GUI identifies positions of representations of OS features that are displayed on the OS GUI;
mapping, by one or more processors, the OS features to application features of the application that is supported by the OS, wherein said mapping establishes a relationship of application tool icons to the application to be equivalent to a relationship of program icons to the OS, and wherein said application tool icons represent functions that are provided by the application;

reformatting, by one or more processors, an original layout of an application GUI for the application to mirror an appearance of the OS GUI, wherein representations of the application features are displayed in a same relative position on a reformatted application GUI as representations of mapped-to OS features on the OS GUI;

determining, by one or more processors, a past frequency of use of the application by a user; and in response to determining that the past frequency of use by the user exceeds a predefined level, reconfiguring, by one or more processors, the application GUI back to the original layout of the application GUI.

2. The method of claim 1, wherein the representations of the OS features are program icons, and wherein the representations of the application features are application tool icons.

3. The method of claim 1, further comprising:

displaying, by one or more processors, OS shortcut icons as a cluster in a specific area on a desktop of the OS GUI;

mapping, by one or more processors, the OS shortcut icons to application shortcut icons;

matching, by one or more processors, the specific area on the desktop of the OS GUI to a specific area of a window from the reformatted application GUI; and displaying, by one or more processors, the application shortcut icons on the specific area of the window from the reformatted application GUI.

4. The method of claim 1, further comprising:

visually modifying, by one or more processors, the representations of OS features differently from the representations of the application features to visually associate the representations of the OS features with the OS and the representations of the application features with the application.

5. A computer program product for reconfiguring an application graphical user interface (GUI), the computer program product comprising a non-transitory computer readable storage medium having program code embodied therewith, the program code readable and executable by a processor to perform a method comprising:

receiving a description of a layout of an operating system (OS) GUI for an OS, wherein the OS supports an application, and wherein the layout of the OS GUI identifies positions of representations of OS features that are displayed on the OS GUI;

mapping the OS features to application features of the application that is supported by the OS, wherein said mapping establishes a relationship of application tool icons to the application to be equivalent to a relationship of program icons to the OS, and wherein said application tool icons represent functions that are provided by the application;

reformatting an original layout of an application GUI for the application to mirror an appearance of the OS GUI, wherein representations of the application features are displayed in a same relative position on a reformatted application GUI as representations of mapped-to OS features on the OS GUI;

visually modifying the representations of OS features differently from the representations of the application features to visually associate the representations of the OS features with the OS and the representations of the application features with the application;

determining a past frequency of use of the application by a user; and in response to determining that the past frequency of use by the user exceeds a predefined level, reconfiguring the application GUI back to the original layout of the application GUI.

6. The computer program product of claim 5, wherein the representations of the OS features are program icons, and wherein the representations of the application features are application tool icons.

7. The computer program product of claim 5, wherein the method further comprises:

displaying OS shortcut icons as a cluster in a specific area on a desktop of the OS GUI;

mapping the OS shortcut icons to application shortcut icons;

matching the specific area on the desktop of the OS GUI to a specific area of a window from the reformatted application GUI; and displaying the application shortcut icons on the specific area of the window from the reformatted application GUI.

8. A computer system comprising:

a processor, a computer readable memory, and a non-transitory computer readable storage medium;

first program instructions to receive a description of a layout of an operating system (OS) GUI for an OS, wherein the OS supports an application, and wherein the layout of the OS GUI identifies positions of representations of OS features that are displayed on the OS GUI;

second program instructions to map the OS features to application features of the application that is supported by the OS;

third program instructions to reformat an original layout of an application GUI for the application to mirror an appearance of the OS GUI, wherein representations of the application features are displayed in a same relative position on a reformatted application GUI as representations of mapped-to OS features on the OS GUI;

fourth program instructions to determine a past frequency of use of the application by a user; and fifth program instructions to, in response to determining that the past frequency of use by the user exceeds a predefined level, reconfigure the application GUI back to the original layout of the application GUI; and wherein the first, second, third, fourth, and fifth program instructions are stored on the non-transitory computer readable storage medium for execution by one or more processors via the computer readable memory.

9. The computer system of claim 8, wherein the representations of the OS features are program icons, and wherein the representations of the application features are application tool icons.

10. The computer system of claim 8, further comprising:

sixth program instructions to display OS shortcut icons as a cluster in a specific area on a desktop of the OS GUI;

seventh program instructions to map the OS shortcut icons to application shortcut icons;

eighth program instructions to match the specific area on the desktop of the OS GUI to a specific area of a window from the reformatted application GUI; and ninth program instructions to display the application shortcut icons on the specific area of the window from the reformatted application GUI; and wherein the sixth, seventh, eighth, and ninth program instructions are stored on the non-transitory computer readable storage medium for execution by one or more processors via the computer readable memory.

11. The computer system of claim 8, further comprising:

sixth program instructions to visually modify the representations of OS features differently from the representations of the application features to visually associate the representations of the OS features with the OS and the representations of the application features with the application; and wherein the sixth program instructions are stored on the non-transitory computer readable storage medium for execution by one or more processors via the computer readable memory.

* * * * *